UNITED STATES PATENT OFFICE 2,395,384

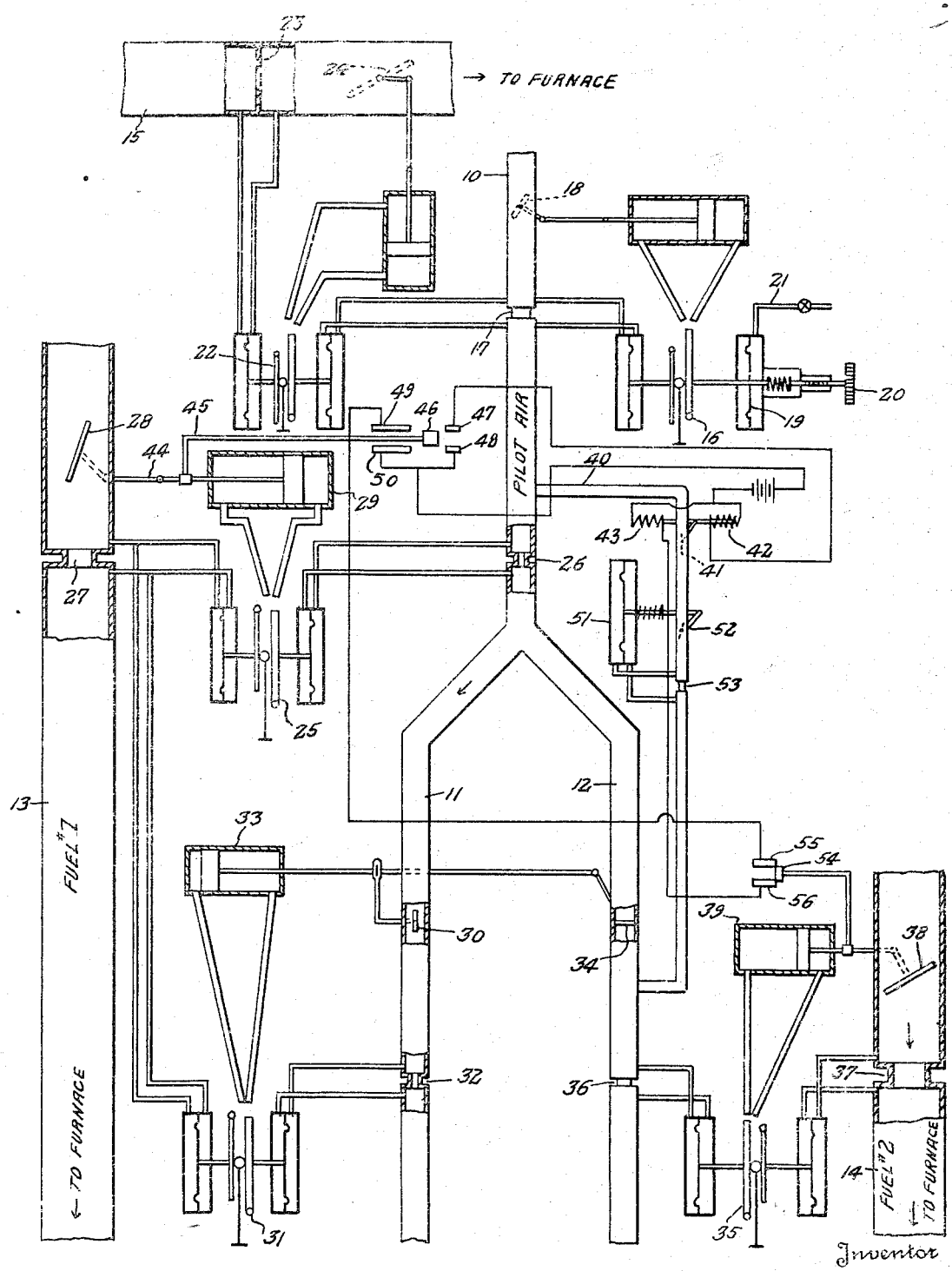

PILOT CONTROL FOR PRIMARY AND SECONDARY FUELS

Herbert Ziebolz, Chicago, Ill., assignor to Askania Regulator Company, Chicago, Ill., a corporation of Illinois Application May 25, 1943, Serial No. 488,426

7 Claims. (Cl. 236—26)

This invention relates to a method of and apparatus for proportioning and controlling primary and secondary fuels, as well as combustion supporting air, used in a furnace installation, employing pilot fluid as a controlling medium. This application is intimately related to my copending application, Ser. No. 488,425, filed on even date herewith. The main idea is to use pilot fluid flows to proportion and control the supplies of primary and secondary fuel to a furnace in accordance with the heat demand and to insure that the secondary fuel will be supplied at a minimum rate of flow when the supply of primary fuel is inadequate to meet the total heat demand. Another aim is to provide a simplified arrangement of this type wherein mechanical summarizers are dispensed with.

Other aims and advantages of the invention will appear in the specification, when considered in connection with the accompanying drawing, which shows a diagrammatic illustration of one form of apparatus embodying the invention.

Referring particularly to the drawing, the illustrated apparatus, insofar as the pilot flow control is concerned, is somewhat analogous to that shown in the patents to Ziebolz and Velten Nos. 2,169,174 and 2,169,175. However, the new arrangement is especially designed to control the supplies of a primary and a secondary fuel in proportion to the heat demand and to the total supply of combustion supporting air, as well as to provide for a minimum supply of secondary fuel when the total available supply of primary fuel is inadequate to meet the demand, all as explained in my aforesaid copending application. It will be understood that the primary fuel may be coke oven gas and the secondary fuel may be any auxiliary fuel, such as natural gas, and that the idea is to use as much of the available primary fuel as possible to supply the heat demand. Incidentally, the total pilot flow for controlling the fuels can be adjusted or controlled either manually or automatically in accordance with the total heat demand. Furthermore, it is contemplated that it may be regulated in accordance with the supply of combustion supporting air.

Referring more particularly to the illustrated apparatus, it is shown as embodying a main pilot conduit 10 having branches 11 and 12 through which pilot air is introduced at a controlled rate to proportion and control the supplies of fuels 1 and 2 through conduits 13 and 14, respectively. Also, the total pilot flow is shown as being utilized to control the supply of combustion supporting air through a conduit 15, all of said conduits leading to a furnace installation (not shown).

The total flow of pilot air through the conduit 10 is adapted to be controlled by a suitable regulator 16 of the well known hydraulic type having an ordinary diaphragm chamber connected across a constriction or measuring orifice 17 in the conduit and arranged to operate the usual control valve 18. The regulator is shown as having a controlling diaphragm 19 which is adapted to be adjusted by a hand wheel 20 exerting spring pressure thereon, in accordance with the desired heat demand. Also, it is contemplated that the heat demand may be regulated or controlled automatically by a master regulator, not shown, connected to the controlling diaphragm chamber by means of a valved conduit 21. It will be understood that the regulator converts the load impulse into a proportional total pilot flow through the conduit 10. The flow will be maintained constant if the regulator is manually adjusted in accordance with the desired heat input.

The supply of combustion supporting air is shown as being controlled in response to the total pilot flow through the conduit 10. For this purpose, a regulator 22 of the hydraulic type is shown as having a diaphragm connected to opposite sides of the constriction or orifice 17 in the conduit 10 and a second diaphragm connected across opposite sides of a constriction or orifice 23 in the air conduit 15, the regulator being also connected to operate a valve 24 to maintain the flow of air proportional to the total pilot flow.

The supply of primary fuel or fuel #1 is likewise shown as being controlled in response to the total pilot flow. For this purpose, another hydraulic regulator 25, like the regulator 22, is shown as having a diaphragm chamber connected across a constriction or measuring orifice 26 in the pilot conduit 10 and a second diaphragm chamber connected across a constriction or orifice 27 in the fuel conduit 13. This regulator operates a fuel control valve 28 in the conduit 13, employing the usual type of reciprocating, servomotor 29 for that purpose.

As long as the supply of primary fuel is adequate to meet the total heat demand, it will be understood that the regulator 25 will function to control the valve 28. The total flow of pilot air is directed through the pilot branch 11 having a control valve 30 operated by a splitting regulator 31 operated by opposed diaphragms connected across a constriction 32 in the branch 11 and the constriction 27 in the fuel conduit 13, respectively, so that the pilot air flow passing through the branch 11 is balanced against the fuel flow in the conduit 13. The splitting regulator 31 is connected through the usual servo-motor 33 to the valve 30 and a second valve 34 in the other branch conduit 12, the latter valve being maintained closed, while the valve 30 is held open as long as the supply of primary fuel meets the demand. The arrangement is such that, when the supply of primary fuel is inadequate to meet the demand, the splitting regulator will partially close the valve 30 and partially open the valve 34 in the pilot branch 12, so that the flow through the latter branch can be utilized to control the flow of secondary fuel. That is to say, a decrease in the flow of primary fuel will call for a proportional decrease in the flow of air through the pilot branch 11 and the balance of the pilot air will be diverted through the pilot branch 12.

In this example, the arrangement is such that the fuel regulator 25 will respond to a decrease in the measured flow of the primary fuel or an increase in demand, represented by an increase in the total pilot flow, and it acts through its servo-motor 29 to call for a minimum permissible flow of the secondary fuel.

The supply of the secondary fuel is controlled by a hydraulic regulator 35 operated in response to the pilot flow through the pilot branch 12, having opposed diaphragms connected across a measuring orifice or constriction 36 in said branch and across an orifice or constriction 37 in the secondary fuel conduit 14, respectively. This regulator operates a control valve 38 by means of another ordinary servo-motor 39, the arrangement being such that the valve is held closed when there is no pilot flow through the branch 12. A by-pass or bleed pipe 40 is connected to the main pilot conduit 10 between the orifices or constrictions 17 and 26 and is arranged to deliver a measured flow of the pilot air, proportional to the desired minimum flow of the secondary fuel, into the branch 12 between the valve 34 and the measuring constriction or orifice 36 to operate the regulator 35.

The by-pass 40 is shown as having a bleed control valve 41 connected to be actuated by a pair of solenoids 42 and 43, the circuits of which are controlled by the position of the piston of the servo-motor 29 operated by the primary fuel regulator. The arrangement is such that the solenoid 42, when it is energized, will open the valve 41 and the solenoid 43 will close it. When the demand exceeds the available supply of primary fuel it will be understood that impulses derived from the measuring orifice 26 in the main pilot conduit 10 will overbalance the impulses derived from the orifice 27 in the primary fuel conduit and the regulator 25 will move the piston of servo-motor 29 to its extreme right hand position, holding the valve 28 wide open. The piston rod 44 of the servo-motor 29 is shown as being connected by an arm 45 to actuate a contact element 46, which is arranged to close the circuits to the respective solenoids 42 and 43 through pairs of contacts 47—48 and 49—50, the contacts 47—48 controlling the circuit to the solenoid 42 and contacts 49—50 controlling the circuit to solenoid 43, as clearly shown.

It will be understood that the valve 41 is normally closed when the system is started. When the circuit is closed through the solenoid 42, due to a deficiency in the supply of primary fuel or to an increasing demand which the primary fuel cannot meet, it will open the bleeder valve, so that some of the total pilot air will be by-passed around the measuring orifice 26. Incidentally, the flow of the by-passed air may be maintained constant by a simple form of diaphragm-operated regulator 51 connected to actuate a control valve 52 in response to impulses derived across a measuring orifice 53. Obviously, this regulator may be adjusted in any well known manner to change the rate of flow, as desired. As soon as the by-passed pilot flow reaches the constriction or measuring orifice 36 in the branch 12, it will operate the regulator 35 to call for a proportional amount of secondary fuel equivalent to the minimum allowable secondary fuel flow. The regulator opens the secondary fuel valve 38 to permit the secondary fuel to flow at a constant rate in accordance with the by-passed pilot flow. Simultaneously, the piston of servo-motor 39 operates a contact element 54 to bridge a pair of contacts 55—56 in the circuit of the second solenoid 43. However, the circuit to that solenoid is not actually closed until the available supply of primary fuel is again equivalent to or exceeds the demand. The valves are shown in their proper positions to permit the minimum, allowable flow of secondary fuel just after the supply of primary fuel has failed to meet the demand. It will be noted that the primary fuel valve has been slightly closed, due to the fact that some of the total air is subtracted from the total pilot flow, thereby permitting the regulator 25 to move its jet pipe to the right to operate the piston of the servo-motor 29 and move it slightly to the left. This reduces the flow of primary fuel by an amount approximately equivalent to the minimum allowable flow of the secondary fuel. The regulator 31 will continue to maintain the splitting valves 30 and 34 in the positions shown, because the reduced amount of total pilot air passing through the measuring orifice 32 will also pass through the measuring orifice 26 and the regulator will remain balanced.

After the secondary fuel is turned on, the available supply of primary fuel will slightly exceed the amount that it is called upon to furnish. Therefore, a further increase in demand will be met by an increase in the flow of the primary fuel until its maximum available supply is again reached. When that happens, the piston of the servo-motor 29 will return to its extreme right hand position, where it holds the valve 28 wide open and maintains the contact element 46 in its circuit closing position between the contacts 47 and 48. Any further increase in demand will now be met by a corresponding increase in the supply of secondary fuel. As the total pilot flow through the orifice 26 and the orifice 32 increases, the splitting regulator 31 will operate to move the piston of its servo-motor 33 to the right, partially closing valve 30 in the branch 11 and partially opening the valve 34 in branch 12, to permit some of the pilot air to flow through the latter branch. This will increase the flow through the measuring orifice 36 and will operate the secondary fuel regulator 35 to increase the opening of the valve 38 in proportion to the amount of pilot air flowing through the branch 12. The reduced impulses derived from the measuring orifice 32 in the branch 11 will then counterbalance the substantially constant impulses derived from the measuring orifice 27 of the primary fuel. The secondary fuel will then continue to meet an increase or decrease in demand.

When the demand decreases to a point where the supply of primary fuel can meet it, the impulses from the measuring orifice 27 in the primary fuel conduit 13 will operate both regulators 25 and 31, so that the latter regulator will restore the splitting valves 30 and 34 to the positions shown. The regulator will then quickly move the piston of the servo-motor 29 to the left and, when it reaches an intermediate position, the contact element 46 will momentarily bridge the contacts 49 and 50. In this position the valve 28 will still be partially open, and since the contacts 55 and 56, controlled by the secondary fuel regulator 35, are already bridged, the second solenoid 43 will be energized to close the bleeder valve 41. Then, the regulator 35 will close the secondary fuel valve 38. After that happens, the primary fuel will supply the total demand until the cycle is repeated. Since the contact element 54 breaks the circuit of the second solenoid valve 43, when the secondary fuel valve is closed, the bridging element 46, operated by the servo-motor of the primary fuel regulator, cannot again close the second solenoid circuit until the cycle is repeated.

Reviewing the operation of the apparatus, an increase in load causes the pilot air valve 18 to open and thereby increase the pressure differential across the restriction 26. This causes the motor 25 to open the primary fuel valve 28 farther while increased pilot air flow also increases the pressure differential across the restriction 32. An increase in the fuel pressure across the restriction 27 offsets this to maintain the motor 33 inactive with the valve 30 open and the valve 34 closed. Upon the valve 28 reaching the wide open position, the contacts 47 and 48 are closed to cause the solenoid 42 to open the valve 41. This bypasses some of the pilot air, causing a pressure differential across the restriction 36, which results in slightly opening the secondary fuel valve 38. At the same time, due to the decrease in the pressure differential across the restriction 26, the primary fuel valve is slightly closed. A further increase in the load first brings the valve 28 back to its wide open position and then increases the opening of the secondary fuel valve 38. When the valve 38 first starts to open, the contacts 55 and 56 in circuit with the solenoid 42 are closed, and as soon as the valve 28 starts to close in response to a decrease in the load below the value that can be handled by the primary fuel, the contacts 49 and 50 are closed to energize the solenoid 43 to close the valve 41 and cut off the by-passed air. When this happens, the pressure differential across the restriction 27 increases slightly and causes the piston in the servo-motor to move again to the right, further opening the valve 28. Thereafter, the fuel load is handled by the primary fuel controller.

It will be understood that the method of control may be applied to more than two fuels since the pilot flow arrangement is capable of duplication to provide for summarizing the flows of three or more fuels. In that case, the main pilot conduit 10 would be converted into one branch of another main conduit (not shown), the remaining branch controlling the third fuel. Furthermore, the apparatus may be employed in a system wherein some other fuel, which is not subject to varying control, is supplied to a furnace.

From the foregoing description, it will be seen that the pilot flow arrangement eliminates the necessity of employing any mechanical summarizing means. Furthermore, the operation of the system is entirely automatic. The pilot air may be derived from the same source as the combustion supporting air for the furnace. Furthermore, all of the regulators are provided with the usual ratio varying or controlling devices, so that the ratios may be changed, as desired, to take into account many different factors, which will be understood by those skilled in the art.

Obviously, the method is not limited to the particular embodiment herein described. Moreover, the apparatus is capable of a variety of changes within the scope of the appended claims.

What is claimed is:

1. Apparatus for controlling and proportioning the supply of a primary and a secondary fuel to a furnace in accordance with the heat demand, comprising, in combination, separate conduits for the fuels and for air to support combustion of the fuels; a main pilot conduit having two branches corresponding with the number of fuel conduits and supplied with pilot air; a regulator connected to control the total flow of pilot air in accordance with the heat demand; an air regulator connected to be controlled by the total flow of pilot air; a primary fuel regulator also connected to respond to the total pilot flow to control the supply of primary fuel as long as its available supply is sufficient to meet the demand; a by-pass pilot conduit leading from the main conduit to one of said branches and having a control valve therein; a measuring regulator connected to the by-pass conduit to maintain a minimum rate of flow therein; a secondary fuel regulator responsive to the pilot flow through said last-named branch; and means connected to be energized by the primary fuel regulator in response to a deficiency in the supply of the primary fuel and connected to open said by-pass valve to divert some of the pilot air flow through said last-named branch, whereby to turn on the secondary fuel at its minimum, permissible rate of flow, said primary fuel regulator responding to the reduced rate of pilot flow to reduce the rate of flow of the primary fuel.

2. Apparatus for controlling and proportioning the supply of a primary and a secondary fuel to a furnace in accordance with the heat demand, comprising, in combination, separate conduits for the fuels and for air to support combustion of the fuels; a main pilot conduit having two branches corresponding with the number of fuel conduits and supplied with pilot air; a regulator connected to control the total flow of pilot air in accordance with the heat demand; an air regulator connected to be controlled by the total flow of pilot air; a primary fuel regulator also connected to respond to the total pilot flow to control the supply of primary fuel as long as its available supply is sufficient to meet the demand; a by-pass pilot conduit leading from the main conduit to one of said branches and having a control valve therein; a measuring regulator connected to the by-pass conduit to maintain a minimum rate of flow therein; a secondary fuel regulator responsive to the pilot flow through said last-named branch; means connected to be energized by the primary fuel regulator in response to a deficiency in the supply of the primary fuel and connected to open said by-pass valve to divert some of the pilot air flow through said last-named branch, whereby to turn on the secondary fuel at its minimum, permissible rate of flow, said primary fuel regulator responding to the reduced rate of pilot flow to reduce the rate of flow of the primary fuel; valves in the pilot branches for said primary and secondary fuels; a splitting regulator responsive to the flow of the primary fuel connected to operate both of said valves simultaneously in opposite directions, maintaining the valve in the branch corresponding with the primary fuel open when the supply of primary fuel is sufficient to meet the demand and maintaining the valve in the branch corresponding with the secondary fuel closed, said splitting regulator actuating said valves to divert some of the pilot flow through the branch corresponding with the secondary fuel, whereby the secondary fuel regulator will respond to said additional pilot flow and act to increase the flow of secondary fuel as the total demand increases.

3. Apparatus, as set forth in claim 1, wherein the primary fuel regulator is of the hydraulic type, operating a servo-motor in response to changes in the pilot flow and in the primary fuel flow, and the servo-motor is connected to control the operation of the valve in the by-pass pilot conduit when the supply of primary fuel is insufficient to meet the demand.

4. Apparatus, as set forth in claim 2, wherein the primary fuel regulator is of the hydraulic type and is connected to operate an ordinary servo-motor, and a solenoid is connected to have its circuit closed by the servo-motor when the supply of primary fuel is insufficient to meet the demand, said solenoid being also connected to operate the valve in the by-pass pilot conduit.

5. Apparatus, as set forth in claim 2, wherein the primary fuel regulator is of the hydraulic type, operating a servo-motor, and the valve in the by-pass pilot conduit is connected to be operated by a pair of solenoids, and the servo-motor of the primary fuel regulator is arranged to control the circuits to said solenoids to open said valve in response to a deficiency in the supply of primary fuel and to close said valve when the supply of primary fuel substantially exceeds the demand.

6. Apparatus, as set forth in claim 2, wherein the splitting and the secondary fuel regulators are provided with ratio varying means.

7. Apparatus, as set forth in claim 2, wherein said valve in the by-pass pilot conduit is connected to be opened and closed by solenoids, and the primary fuel regulator is connected to control both solenoid circuits, and the secondary fuel regulator is also connected to complete a portion of the circuit of the valve-closing solenoid when the secondary fuel is turned on.

HERBERT ZIEBOLZ.